United States Patent [19]

Carpenter

[11] 4,452,541
[45] Jun. 5, 1984

[54] MOTOR ARMATURE SHAFT ENDPLAY REDUCTION APPARATUS

[75] Inventor: Keith H. Carpenter, Kettering, Ohio

[73] Assignee: General Motors Corporation, Detroit, Mich.

[21] Appl. No.: 414,900

[22] Filed: Sep. 3, 1982

[51] Int. Cl.³ .................... F16C 17/08; F16C 27/08
[52] U.S. Cl. .................................................. 384/223
[58] Field of Search ............... 384/223, 215, 106, 124, 384/125

[56] References Cited

U.S. PATENT DOCUMENTS

| | | |
|---|---|---|
| 2,030,193 | 2/1936 | Arnold . |
| 2,161,168 | 6/1939 | Hutter .............................. 384/223 |
| 2,283,440 | 5/1942 | Hufferd . |
| 2,904,709 | 9/1959 | Lautner ................................ 310/90 |
| 3,073,654 | 1/1963 | Richey . |
| 3,441,325 | 4/1969 | Sjøtun . |
| 3,549,218 | 12/1970 | Cagnon et al. . |
| 3,697,144 | 10/1972 | Beeskow . |
| 3,749,457 | 7/1973 | Latussek et al. .................... 384/223 |

Primary Examiner—Lenard A. Footland
Attorney, Agent, or Firm—Robert M. Sigler

[57] ABSTRACT

Shaft endplay reducing apparatus for a dynamoelectric machine includes a sheet of resilient material held only by its edges in the machine stator apparatus adjacent one end of the armature shaft. A hardened thrust bearing member is supported by the sheet in abutment with the end of the armature shaft. The sheet of resilient material has low noise transmissibility in tension to reduce noise transmitted from the armature or thrust bearing member to the stator apparatus for radiation to the environment.

2 Claims, 3 Drawing Figures

MOTOR ARMATURE SHAFT ENDPLAY REDUCTION APPARATUS

BACKGROUND OF THE INVENTION

This invention relates to apparatus for reducing the axial endplay of a motor armature shaft and particularly to such apparatus which minimizes the internally generated noise which is transmitted to the motor case for radiation to the surrounding environment.

Armature shafts in electric motors are sometimes subjected to axial forces which may cause them to move axially back and forth noisily between whatever stops are provided by the motor case unless they are restrained in some manner. For example, in a windshield wiper motor, such axial motion is often caused by load reversals as the windshield wiper blade changes wipe direction.

Among the various means for reducing the axial endplay of such motor armature shafts is the inclusion of a thrust bearing arrangement in which a knob of good bearing material or a steel ball is pressed into the shaft end to bear against a thrust plate which is made of a compatible bearing material. In some cases in the prior art, the arrangement is made somewhat resilient to take up any axial endplay, as in the resilient elongated arms of the sheet metal plates in the structure shown in the U.S. Pat. No. 2,030,193 to Arnold or the resilient nylon disk of the arrangement in the U.S. Pat. No. 2,904,709 to Lautner. Sometimes, as in the U.S. Pat. No. 3,549,218, to Cagnon et al a thrust member is supported directly by the motor case.

However, it is not only desirable that the apparatus used to take endplay of a motor armature shaft have superior bearing qualities. It is further desirable, in many applications, that the arrangement minimize the transmission of audible noise generated in the armature or between the armature and thrust bearing surface during motor operation to the motor case for radiation to the motor environment. In general, the most favorable bearing materials such as steel or Vespel ® are very hard materials and therefore good noise conductors; and those resilient materials which have lessened noise transmissibility are generally not suitable for bearing use. Even the addition of a resilient backing or similar support for a hard bearing material does not necessarily decrease the noise transmission therethrough, since the thrust load generally places the resilient material in compression and thereby increases its noise transmissibility.

SUMMARY OF THE INVENTION

Therefore it is an object of this invention to provide motor armature shaft endplay reducing apparatus which combines the desirable bearing properties of a hard bearing material with the low noise transmissibility of a resilient material.

It is a further object of this invention to provide such apparatus made of common, inexpensive materials and adapted for fast, inexpensive assembly in a mass production situation.

These and other objects are obtained in an apparatus comprising a sheet of resilient material having low noise transmissibility when placed in tension and a hardened thrust bearing member supported by the sheet in abutment with one end of the armature shaft. The sheet is supported by the motor frame or case assembly only by its edges and the thrust bearing member is supported centrally therein so that the axial force from the armature shaft places the sheet in tension for low transmission of noise from the armature shaft and thrust bearing member to the motor case or frame.

Further details and advantages of this invention will be apparent from the accompanying drawings and following description of the preferred embodiment.

DESCRIPTION OF THE PREFERRED EMBODIMENT

Figure 1:
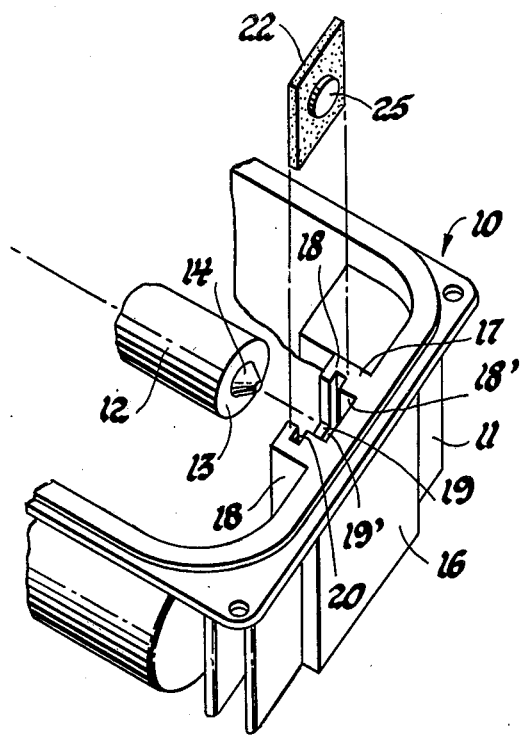
FIG. 1 shows an exploded perspective view of a portion of a motor including apparatus according to this invention.

Referring to FIG. 1, an electric motor 10 includes a frame or case, part of which is shown at 11, which comprises part of the stator appratus. Case 11 further supports, by means of radial bearings, not shown, an armature having a shaft 12, into one end 13 of which is pressed or otherwise assembled an end thrust member 14 comprising a knob or ball of a good hard bearing material such as steel or Vespel ®. Clearly, there are many suitable materials for end thrust bearing member 14 and many ways known to those skilled in the art for forming said end thrust member in the end 13 of shaft 12.

From one end wall 16 of case 11 projects a box-shaped structure 17 which is open toward the end 13 of armature shaft 12 and includes at least a pair of opposite side walls 18 and, in this embodiment, a bottom wall 19. At least the side walls 18 and possibly also the bottom wall 19 have inner surfaces 18' and 19' parallel to the axis of shaft 12, which are provided with grooves 20 which are circumferentially connecting or aligned.

Figure 2:
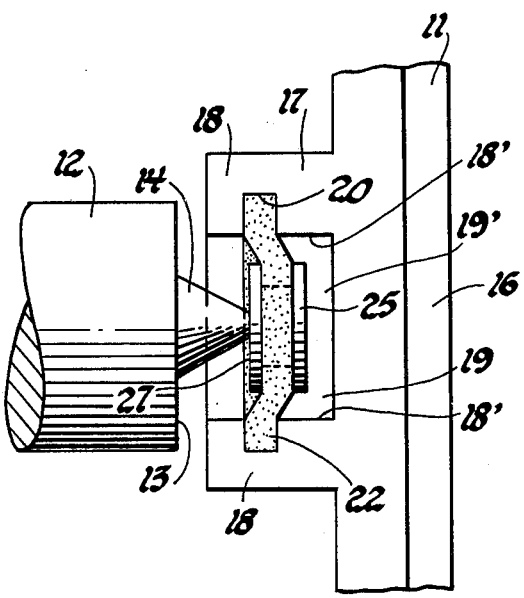
FIG. 2 shows a top view of a portion of the assembled apparatus of FIG. 1.
Figure 3:
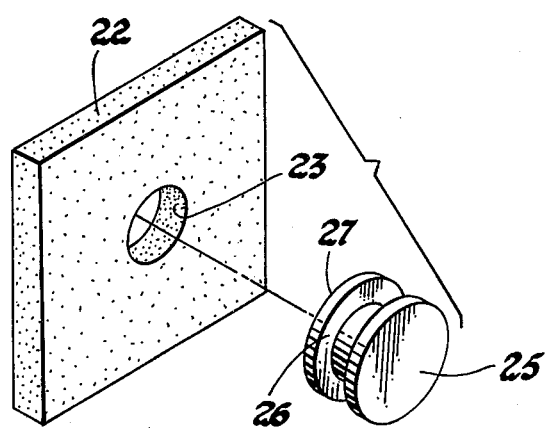
FIG. 3 shows an exploded view of apparatus according to this invention for use in the apparatus in FIG. 1.

Referring to FIG. 3, a flat rectangular sheet of resilient material 22 having a thickness just smaller than the width of grooves 20 has a circular opening 23 near the center thereof. A thrust bearing member 25 made of a hardened bearing material such as steel or Vespel ® is disk-shaped with a circumferential groove 26 formed thereabout. The outer diameter of thrust bearing member 25 is greater than the inner diameter of opening 23; and the bottom diameter of groove 26 of thrust bearing member 25 is the same or less than the inner diameter of opening 23. Therefore, as seen in FIG. 1, end thrust bearing member 25 may be disposed in opening 23 of member 22 by means of the sheet of resilient material entering and fitting snugly in groove 26. As seen in FIGS. 1 and 2, member 22 is inserted in grooves 20 of box structure 17 to be supported thereby only by its edges. Those skilled in the art will recognize many ways of retaining the edges of member 22 in grooves 20, including deformation of the walls to clamp the edges.

End thrust member 14 of shaft 12 bears against one axial surface 27 of thrust bearing member 25 to place resilient material 22 slightly in tension or shear so that endplay of armature shaft 12 is taken up and axial movement thereof suppressed. The material from which member 22 is constructed is one, such as rubber, which has a low noise transmissibility when in tension or shear so that the transmission of noise from armature shaft 12 or thrust bearing member 25 through member 22 to frame 11 is minimized. The materials of thrust member 14 and thrust bearing member 25 are good complementary bearing materials for long wear and low friction. Other details of the construction are not critical to the invention and are left to the individual requirements of those skilled in the art.

The embodiments of the invention in which an exclusive property or privilege is claimed are defined as follows:

1. Shaft end play reducing apparatus for a dynamoelectric machine having a rotatable armature including an armature shaft supported for rotation relative to a stator assembly and subject to possible axial shaft end play, the apparatus comprising:
   a sheet of resilient material having low noise transmissibility in tension, said sheet being supported by said stator assembly only by its edges adjacent one end of the armature shaft and substantially normal thereto; and
   a hardened thrust bearing member supported centrally on said sheet, with respect to the support of said sheet, and spaced radially inwardly from the stator assembly, in abutment with the one end of the armature shaft so as to place the sheet in tension, whereby the shaft end play is reduced with low transmission of noise from the armature shaft and thrust bearing member to the stator assembly.

2. Shaft end play reducing apparatus for a dynamoelectric machine having a rotatable armature including an armature shaft supported for rotation relative to a stator assembly and subject to possible axial shaft end play, the apparatus comprising:
   a plurality of walls projecting from the stator assembly, each of said walls having at least one surface parallel to the axis of the armature shaft and including a groove perpendicular to said axis;
   a sheet of resilient material having low noise transmissibility in tension, said sheet being supported adjacent one end of the armature shaft only by its edges being retained in said grooves, said sheet further having a central opening; and
   a hardened thrust bearing member having a peripheral groove adapted for insertion in the opening of said sheet for retention thereby in abutment with one end of the armature shaft so as to place the sheet in tension, whereby shaft end play is reduced with low noise transmission from the armature shaft and thrust bearing member to the stator assembly.

* * * * *